US012577832B2

(12) United States Patent
Frede

(10) Patent No.: US 12,577,832 B2
(45) Date of Patent: Mar. 17, 2026

(54) DOOR OPERATION SYSTEM

(71) Applicant: Assa Abloy Entrance Systems AB, Landskrona (SE)

(72) Inventor: Friedhelm Frede, Erwitt (DE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 17/801,503

(22) PCT Filed: Mar. 11, 2021

(86) PCT No.: PCT/EP2021/056150

§ 371 (c)(1),
(2) Date: Aug. 22, 2022

(87) PCT Pub. No.: WO2021/180831

PCT Pub. Date: Sep. 16, 2021

(65) Prior Publication Data

US 2023/0090663 A1 Mar. 23, 2023

(30) Foreign Application Priority Data

Mar. 12, 2020 (SE) .................................. 2030076-0

(51) Int. Cl.
*E06B 9/72* (2006.01)
*E06B 9/58* (2006.01)

(52) U.S. Cl.
CPC . *E06B 9/72* (2013.01); *E06B 9/58* (2013.01)

(58) Field of Classification Search
CPC ...... E06B 2009/0684; E06B 9/11; E06B 9/15; E06B 9/17; E06B 9/0646; E06B 9/58; E06B 9/70; E06B 9/72
See application file for complete search history.

(56) References Cited

U.S. PATENT DOCUMENTS 3,012,520 A * 12/1961 Curtis ..................... E05F 15/41 192/116.5
3,092,170 A * 6/1963 Ellis .......................... E06B 9/08 160/264

(Continued)

FOREIGN PATENT DOCUMENTS

EP 1223301 7/2002
WO 9742391 11/1997

(Continued)

OTHER PUBLICATIONS

International Search Report and Written Opinion in PCT/EP2021/056150, mailed Jun. 16, 2021.
Swedish Search Report in 2030076-0 mailed Sep. 24, 2020.

*Primary Examiner* — Abe Massad
*Assistant Examiner* — John W Hanes, Jr.
(74) *Attorney, Agent, or Firm* — Wissing Miller LLP

(57) ABSTRACT

A door operation system (1) for a door (2) moves a protective barrier (3) between a rolled-in, open state and a rolled-out, closed state. First tracks (9*a*, 9*b*) are arranged on side frames (19*a*, 19*b*) at each side of the barrier. Curved or spiral tracks (13*a*, 13*b*) are arranged at each side of the barrier (3) to hold the barrier (3) in the rolled-in state. A drive unit (6) connected to the protective barrier (3) moves the barrier (3) between the rolled-out and rolled-in state and vice versa. The barrier (3) comprises first transmission elements (11*a*, 11*b*) connected to the drive unit (6). The curved or spiral tracks (13*a*, 13*b*) each a comprise second transmission elements (14*a*, 14*b*). The first transmission elements (11*a*, 11*b*) are omega drive units that mesh with the second transmission elements (14*a*, 14*b*) to move the protective barrier (3) along the second transmission elements (14*a*, 14*b*).

11 Claims, 9 Drawing Sheets

(56) References Cited

U.S. PATENT DOCUMENTS 3,840,061 A * 10/1974 Herms ...................... E06B 9/76 160/133
5,036,899 A * 8/1991 Mullet .................... E05D 15/24 49/358
5,564,164 A * 10/1996 Jella ........................ E06B 9/581 16/355
7,048,029 B2 * 5/2006 Rieder .................. E05F 15/676 49/358
7,810,544 B2 * 10/2010 Spiess ................... B66B 13/305 160/242
7,816,879 B2 * 10/2010 Taheri ................... E05F 15/635 318/266
7,856,758 B2 * 12/2010 Ressel ................... E05F 15/603 49/362
7,913,739 B2 * 3/2011 Rejc .......................... E06B 9/62 160/133
8,333,229 B2 * 12/2012 Kimener ................... E06B 9/58 160/242
8,418,279 B2 * 4/2013 Coenraets ........... E04F 10/0607 4/502
8,464,470 B2 * 6/2013 Katagata ............... E05F 15/643 49/360
8,757,017 B2 * 6/2014 Bauer ..................... F16H 19/06 74/89.21
8,899,297 B2 * 12/2014 Mazej ....................... E06B 9/70 160/310
9,458,654 B2 * 10/2016 Palsson ............... E05D 15/0634
9,637,972 B2 * 5/2017 Miller ....................... E06B 9/88
11,105,133 B2 * 8/2021 Sauve ................... E05D 15/242
11,162,301 B2 * 11/2021 Ouyang .............. E06B 9/17007
2004/0163777 A1 * 8/2004 Frede ........................ E06B 9/17 160/268.1
2004/0182528 A1 * 9/2004 Rieder .................. E05F 15/676 160/188
2006/0124252 A1 * 6/2006 Miller ..................... E01F 13/04 160/113
2008/0251220 A1 * 10/2008 Rejc .......................... E06B 9/08 160/266
2009/0188166 A1 7/2009 Taheri et al.
2010/0024308 A1 * 2/2010 Coubray ................. E05F 15/67 49/362
2011/0146920 A1 * 6/2011 Mazej ....................... E06B 9/08 160/311
2017/0356240 A1 * 12/2017 Balbach .................. E06B 9/174
2018/0258689 A1 * 9/2018 Rejc .......................... E06B 9/68
2018/0313140 A1 * 11/2018 Rejc ...................... E05F 15/684
2019/0071923 A1 * 3/2019 Ouyang ................ E06B 9/0638
2019/0263228 A1 * 8/2019 Zeng ......................... E06B 9/15
2021/0131178 A1 * 5/2021 Fischer ................... E06B 9/171
2021/0148166 A1 * 5/2021 Fischer ..................... E06B 9/58
2021/0293515 A1 * 9/2021 Mazej ....................... E06B 9/15

FOREIGN PATENT DOCUMENTS

WO 2019034323 2/2019
WO 2019192976 10/2019

* cited by examiner

DOOR OPERATION SYSTEM

This application is a 371 of PCT/EP2021/056150, filed on Mar. 11, 2021, published on Sep. 16, 2021 under publication number WO 2021/180831, which claims priority benefits from Swedish Patent Application No. 2030076-0, filed on Mar. 12, 2020, the disclosure of which is incorporated herein by reference.

FIELD OF THE INVENTION

The present invention relates to a door operation system for a door.

BACKGROUND ART

A door operator system for a door typically comprises a door connected to a door frame and a drive unit arranged to move the door along the door frame between an closed and open position for opening and closing the opening, and vice versa. Doors typically used as garage doors or as industrial doors. A motor or a mechanical unit such as a spring or a support motor may be used as drive unit to move the door. Such doors may be known as spiral doors or high speed roll doors.

The most common doors of exterior application have a door curtain or protective barrier of rigid panels connected to each other. In the opened position, the protective barrier is rolled up in a roll at a drum. The drum may have the contour of a spiral to enable a continuous increase of roll up radius. At the most common spiral door type the curtain is usually pushed during the opening process into fixed sprial tracks, which are located above the door lintel on both sides of the protective barrier. Lifting devices, such as a timing belt, a roller chain or steel ropes, are connected to a drive unit. The lifting device is fixed to the bottom panel and push the protective barrier upwards.

Document U.S. Pat. No. 7,913,739 B2 discloses a spiral door, wherein a door curtain is pulled into and pushed out of a fixed spiral track. Two telescopic arms, which are fixed at a motor driven drum are connected to the right hand side and left hand side of the top panel curtain for pulling the curtain upwards into the spiral track and for pushing the curtain downwards out of the spiral track.

SUMMARY

The disadvantage of spiral doors with a lifting device fixed to the bottom panel is that they are crash sensitive. In case of a collision causing a damage at the bottom panel, e.g. by a fork lift truck, the door cannot longer be operated. In addition, a visible drum is required to drive the lifting devices on both sides of the door. In addition, the guiding track need to be straight in closed position.

The spiral door provided with two telescopic arms may be operated even after the door bottom panels have been damaged and dismantled. However, the telescopic arm of such a door has been extended to its maximum length when the door is closed. This requires high torque forces of a drive unit to start the opening process. Therefore, high torque drive units and balancing components may be required to operate such a door, which may be cost intensive. The required high torque forces may also result in wear of the components of such known spiral door.

There is a need to provide a door operation system for a door which seeks to mitigate, alleviate, or eliminate one or more of the above-identified deficiencies in the art and disadvantages singly or in any combination.

Thus, there is a need to develop a door operation system with reduced complexity for facilitating installation and reducing the need of maintenance.

Further, there is a need to develop a door operation system for a door, which uses cost efficient components.

Further, there is a need to develop a door operation system for a door in which the operating forces are as low as possible.

An object of the present disclosure is therefore to provide a door operation system, which seeks to mitigate, alleviate, or eliminate one or more of the above-identified deficiencies in the art and disadvantages singly or in any combination.

A further object of the present invention is to develop a door operation system with reduced complexity for facilitating installation and reducing the need of maintenance.

A further object of the present invention is to develop a door operation system for a door, which uses cost efficient components.

A further object of the present invention is to develop a door operation system for a door in which the operating forces are as low as possible.

In this disclosure, a solution to the problem outlined above is proposed. In the proposed solution, a door operation system for a door is described. The door comprising: a protective barrier configured to be in a rolled-in open state and configured to cover a door opening in a rolled-out closed state; and first tracks arranged on side frames at each side of the protective barrier. The door operation system comprising: curved or spiral tracks arranged at each side of the protective barrier for accommodation of the protective barrier in a rolled-in open state; and at least one drive unit connected to the protective barrier for moving the protective barrier from a rolled-out closed state to the rolled-in open state and vice versa; wherein the protective barrier comprises first transmission elements connected to the at least one drive unit; wherein the curved or spiral tracks each comprises a second transmission element; and wherein the first transmission elements are omega drive units configured to mesh with the second transmission elements and to move the protective barrier along the second transmission elements by operating the drive unit for moving the protective barrier from the rolled-out closed state to the rolled-in open state, and vice versa. Such door operator system will mitigate, alleviate, or eliminate one or more of the above-identified deficiencies in the art and disadvantages singly or in any combination. Further, the complexity of the door operator system will be reduced, the operating forces of the door operator system will be as low as possible, a minimum of wear will be generated and large opening sizes of the door will be enabled. The protective barrier may be operated in both the rolled-in opening direction and the rolled out closing direction. The protective barrier may be possible to operate with the protective barrier in a vertical or horizontal orientation or with the protective barrier orientated in an angle in relation to a vertical. The protective barrier may also follow a curve. No drum extending between right and left hand side of the protective barrier is visible when the protective barrier is rolled-out. Since the protective barrier is moved along the second transmission elements low torque forces are required to start the opening process. The protective barrier of the door may move in a speed faster than 0.5 meters per second. The protective barrier of the door may move in a speed of 2 meters per second or faster. The protective barrier may have large height and width in order to cover and close a large door opening size. The first and curved or spiral tracks may have similar or different configurations and designs. The first may have straight extension or an extension, which differs from a straight extension. The first tracks may extend in the same direction as the direction of the side frames. The curved or spiral tracks may extend in the same direction as the direction of the side frames or in another direction. The drive unit may be a low torque drive unit, which generates low torque when rolling-in and rolling-out the protective barrier. The drive unit may be an electrical machine, such as an electrical motor. The first and second transmission elements are configured for moving the protective barrier at high speed. Arranging the second transmission elements at the curved or spiral tracks provides for a pulling operation of the protective barrier when rolling-in the protective barrier and a pushing operation of the protective barrier when rolling-out the protective barrier. The protective barrier is not or less crash sensitive. In case of a collision damage, e.g. by a fork lift truck, the protective barrier may still be operated. The second transmission elements, which are arranged at the curved or spiral tracks are not exposed to water and dirt, which may increase the life span of the door. In the rolled-in state of the protective barrier, the protective barrier has been pulled away from the door opening and access through the door opening is possible. In the rolled-out state of the protective barrier the protective barrier covers the door opening and no access through the door opening is possible.

According to an aspect, the curved or spiral tracks have a curved or spiral shape. Such curved or spiral shape of the curved or spiral tracks provides for a fast opening and closing of the protective barrier. Also the second transmissions will have a curved or spiral shape since the second transmission elements are arranged at the curved or spiral tracks. Rolling up the protective barrier in a spiral require a minimum of space over the lintel when the protective barrier is in the rolled-in state. The spiral shape when rolled-up into a drum enables a continuous decrease of roll up radius. The operating forces for rolling-out and rolling-in the protective barrier will be low due to the second transmission elements arranged at the curved or spiral tracks. This will result in a minimum wear and enable large opening sizes of the protective barrier and also the door opening. A drum between right and left hand side will not be visible when protective barrier is in the rolled-out closed state.

According to an aspect, the omega drive units are connected to the drive unit by means of a torque transmission unit. The drive unit is configured to provide the omega drive units with torque and rotation movement. The drive unit may be arranged at a distance from the omega drive units. The torque transmission unit will thus transmit the torque and rotation movement from the driving unit to the omega drive units. The drive unit may be arranged at a position which is outside the area or space between the first or the curved or spiral tracks and the torque transmission unit extends from the drive unit into the area or space between the first or the curved or spiral tracks.

According to an aspect, a gearbox is arranged between the torque transmission unit and the omega drive units, which gearbox is configured to distribute torque and rotational movement from the drive unit to the omega drive units. The drive unit may be arranged adjacent to the gearbox and connected to the gearbox. Alternatively, the drive unit may be arranged at a distance from the gearbox and be connected to the gearbox via the torque transmission unit. The gearbox may be arranged between the omega drive units and connected to the omega drive units by means of drive shafts.

According to an aspect, the torque transmission unit is a telescopic propeller shaft. The telescopic propeller shaft may compensate for distance and angle changes between the omega drive units and the drive unit during open and closing the protective barrier. The telescopic propeller shaft may compensate for distance and angle changes between the gearbox and the drive unit during open and closing the protective barrier. The telescopic feature may be accomplished by a longitudinal coupling unit.

According to an aspect, the torque transmission unit is a flexible shaft. The flexible shaft may compensate for distance and angle changes between the omega drive units and the drive unit during open and closing the protective barrier. The flexible shaft may compensate for distance and angle changes between the gearbox and the drive unit during rolling-in and rolling-out the protective barrier. The flexible shaft may comprise a bundle of steel wires or a rubber shaft or a polymeric shaft.

According to an aspect, the at least one drive unit is arranged at one of the side frames. The side frames may have a rigid design. The side frames may be arranged at a position which is outside the area or space between the first or the curved or spiral tracks. Thus, the drive unit may be arranged at a position which is outside the area or space between the first or the curved or spiral tracks. The torque and movement generated by the drive unit may be transmitted to the movable protective barrier by means of the torque transmission unit.

According to an aspect, the at least one drive unit is arranged on the protective barrier. This will provide for a compact design. The drive unit may be an electrical motor driven by a battery, which is also arranged on the protective barrier. When rolling-up and rolling-in the protective barrier, the drive unit will follow the movement of the protective barrier. The at least one drive unit may be arranged at the top of the protective barrier.

According to an aspect, the omega drive units comprise sprockets and the second transmission elements are chains. Sprocket and chains may together transmit a large amount of torque and force. Sprocket and chains may together transmit high speeds. Such transmission is also reliable and requires a small amount of maintenance. Such transmission is also compact and requires little space. Chains may also follow a curved or spiral shape.

According to an aspect, the omega drive units comprise toothed pulleys and the second transmission elements are timing belts. Toothed pulleys and timing belts may together transmit a large amount of torque and force. Toothed pulleys and timing belts may together transmit high speeds. Such transmission is also reliable and requires a small amount of maintenance. Such transmission is also compact and requires little space. Timing belts may also follow a curved or spiral shape.

According to an aspect, the omega drive units comprising sprockets and wheels. An omega drive unit may comprise at least one sprocket or at least one toothed pulley and at least two wheels arranged along the chain or timing belt. Using omega drive units will create a reliable transmission, which requires a small amount of maintenance.

According to an aspect, the protective barrier comprising a plurality of horizontal and interconnected sections guided in the side frames. The sections may be interconnected by hinges and/or sealings. The sections may be designed in steel, aluminum, wood and/or a plastic material. The sections may be designed in a sandwich arrangement and/or a foam element. The interconnected sections may be disconnected in case of a failing section. A failing section may be easily replaced.

According to an aspect, the omega drive units are arranged at one of the sections near the curved or spiral tracks. The protective barrier may be operated in both the rolling-in and rolling-out direction by actively applying operating forces at the upper area of protective barrier. The protective barrier may be rolled-in and rolled-out even though one or a number of the bottom panels are dismantled, e.g. after a collision. The driving components located in the upper area are less weather exposed.

In the proposed solution, also a method for replacing sections of a protective barrier of a door is described. The door comprising: first tracks arranged on side frames at each side of the protective barrier, wherein the protective barrier is configured to cover a door opening and wherein the protective barrier comprising a plurality of horizontal and interconnected sections connected to the side frames; a door operation system comprising: curved or spiral tracks arranged at each side of the protective barrier for accommodation of the protective barrier in an rolled-in open state; and at least one drive unit connected to the protective barrier for moving the protective barrier from a rolled-out closed state to the rolled-in open state and vice versa; wherein the protective barrier comprises first transmission elements, connected to the at least one drive unit; wherein the curved or spiral tracks each comprises a second transmission element; and wherein the first transmission elements are omega drive units configured to mesh with the second transmission elements and to move the protective barrier along the second transmission elements by operating the drive unit for moving the protective barrier from the rolled-out closed state to the rolled-in open state, and vice versa, wherein the method comprising the step of: replacing at least one of the sections farthermost from the curved or spiral tracks. Such a replacement of the at least one of the sections farthermost from the curved or spiral tracks may be easily performed. Since the omega drive units are arranged at the sections closest to the curved or spiral tracks the protective barrier may be operated even though the sections farthermost from the curved or spiral tracks are dismantled from the protective barrier. The protective barrier is not crash sensitive or is less crash sensitive. Thus, in case of a collision damage, e.g. by a fork lift truck, the protective barrier may still be operated even though the sections farthermost from the curved or spiral tracks are damaged. The interconnected sections connected to the side frames may also have another configuration than horizontal.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present invention will be more fully appreciated by reference to the following illustrative and non-limiting detailed description of example embodiments of the present invention, when taken in conjunction with the accompanying drawings.

DETAILED DESCRIPTION

The present disclosure will now be described with reference to the accompanying drawings, in which currently preferred example aspects and embodiments of the disclosure are shown. This disclosure may, however, be embodied in many different forms and should not be construed as limited to the herein disclosed embodiments. The disclosed aspects and embodiments are provided to fully convey the scope of the disclosure to the skilled person.

Figure 1:
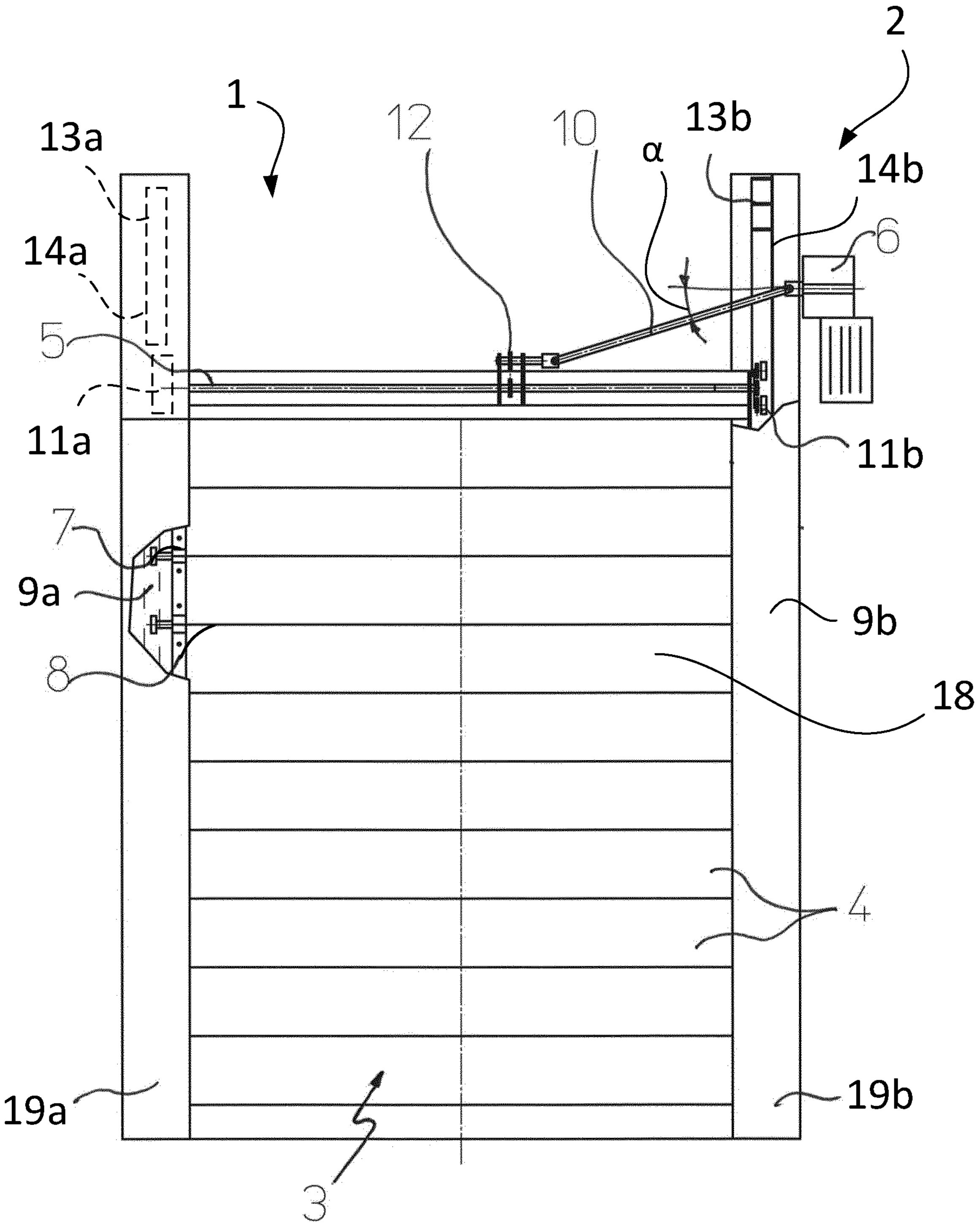
FIG. 1 shows a schematic front view of a door operator system for a door according to the invention, with a protective barrier in a rolled-out closed state.

FIG. 1 shows a schematic front view of a door operator system 1 for a door 2 according to the invention, with a protective barrier 3 in a rolled-out closed state. The protective barrier 3 is configured to cover a door opening 18. First tracks 9*a*, 9*b* are arranged on side frames 19*a*, 19*b* at each side of the protective barrier 3. Curved or spiral tracks 13*a*, 13*b* are arranged at each side of the protective barrier 3 for accommodation of the protective barrier 3 in a rolled-in open state. A drive unit 6 is connected to the protective barrier 3 for moving the protective barrier 3 from a rolled-out closed state to the rolled-in open state and vice versa. Omega drive units 11*a*, 11*b* are connected to the drive unit 6 via a drive shaft 5, a gearbox 12 and a torque transmission unit 10. The drive unit 6 is arranged at a distance from the omega drive units 11*a*, 11*b*. The drive unit 6 is arranged at one of the side frames 19*a*, 19*b*. The drive unit 6 is arranged at a position which is outside the area or space between the curved or spiral tracks 13*a*, 13*b* and the torque transmission unit 10 extends from the drive unit 6 into the area or space between the curved or spiral tracks 13*a*, 13*b*. The protective barrier 3 comprises a plurality of horizontal and interconnected sections 4 guided in the first tracks 9*a*, 9*b*. The sections 4 may be interconnected by hinges 7 and/or sealings 8. The omega drive units 11*a*, 11*b* are arranged at one of the sections 4 near the curved or spiral tracks 13*a*, 13*b*. Thus, the omega drive units 11*a*, 11*b* may be arranged nearby or above one of the sections 4 near the curved or spiral tracks 13*a*, 13*b*.

The gearbox 12 comprises sprockets and chain and the gearbox 12 is configured to distribute torque and rotational movement from the drive unit 6 to the omega drive units 11*a*, 11*b* via the torque transmission unit 10 and the drive shaft 5. The gearbox 12 is arranged between the omega drive units 11*a*, 11*b* and arranged on the protective barrier 3.

The torque transmission unit 10 may be a telescopic propeller shaft or a flexible shaft, which may compensate for distance and angle changes between the gearbox 12 and the drive unit 6 during open and closing the protective barrier 3.

Each of the curved or spiral tracks 13*a*, 13*b* comprises a second transmission element 14*a*, 14*b*. The omega drive units 11*a*, 11*b* are configured to mesh with the second transmission elements 14*a*, 14*b* and to move the protective barrier 3 along the second transmission elements 14*a*, 14*b* by operating the drive unit 6 for moving the protective barrier 3 from the rolled-out closed state to the rolled-in open state, and vice versa. The protective barrier 3 may be operated in both the opening and closing direction. In the rolled-out state of the protective barrier the protective barrier 3 covers the door opening 18 and no access through the door opening 18 is possible.

Figure 2:
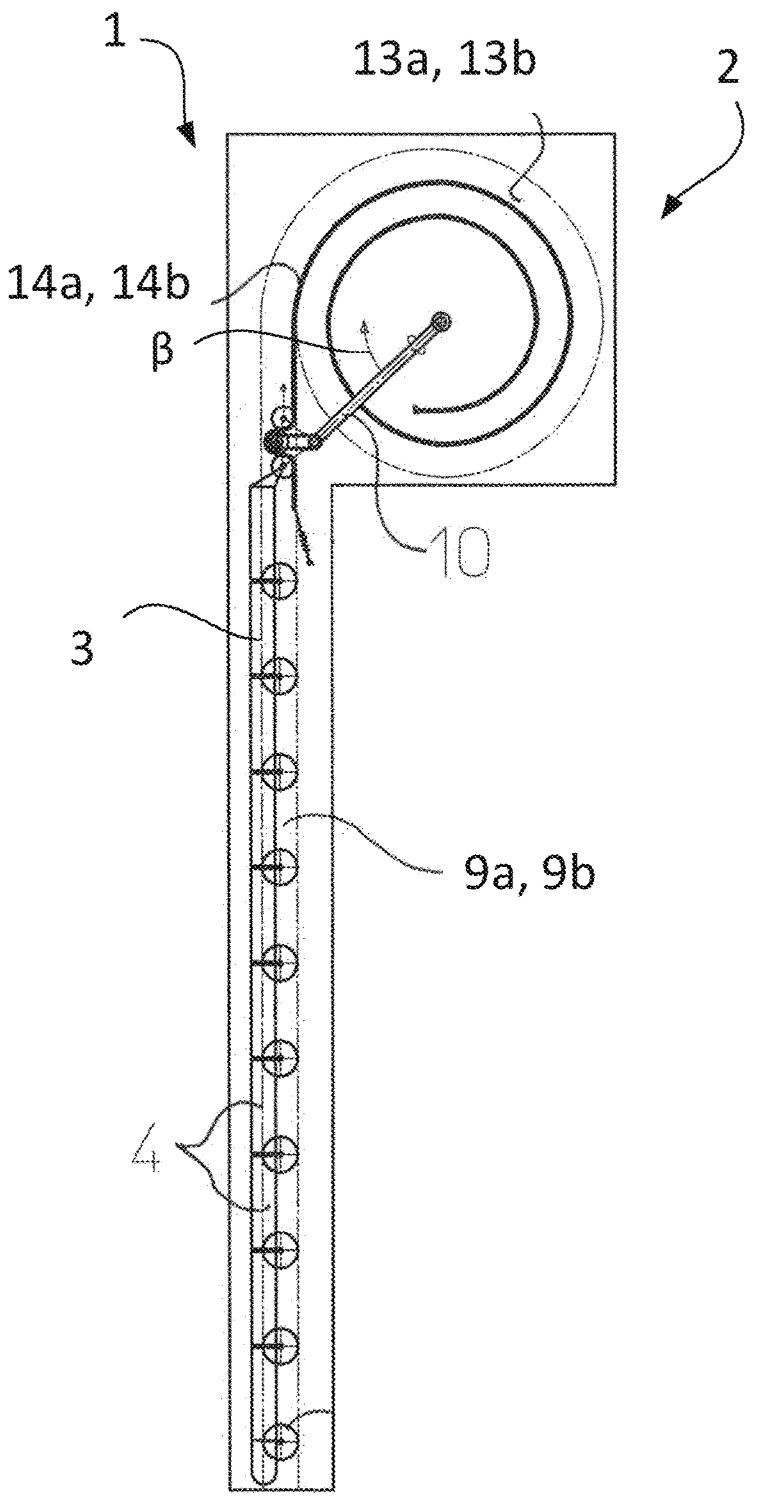
FIG. 2 shows a schematic side view of a door operator system for a door according to the invention, with a protective barrier in a rolled-out closed state.

FIG. 2 shows a schematic side view of the door operator system 1 for the door 2 according to the invention, with the protective barrier 3 in a rolled-out closed state. The curved or spiral tracks 13*a*, 13*b* have a curved or spiral shape. The second transmission elements 14*a*, 14*b* also have a curved or spiral shape since the second transmission elements 14*a*, 14*b* are arranged at the curved or spiral tracks 13*a*, 13*b*. The curved or spiral shape of the drum or part of the drum enables a continuous decrease of roll up radius. The drive unit 6 (FIG. 1) is connected to the torque transmission unit 10 in the center of the second track 13*b*. The torque transmission unit 10 extend in angels $\alpha$, $\beta$ in relation to a horizontal plane. The angle $\alpha$ is disclosed in FIG. 1.

Figure 3:
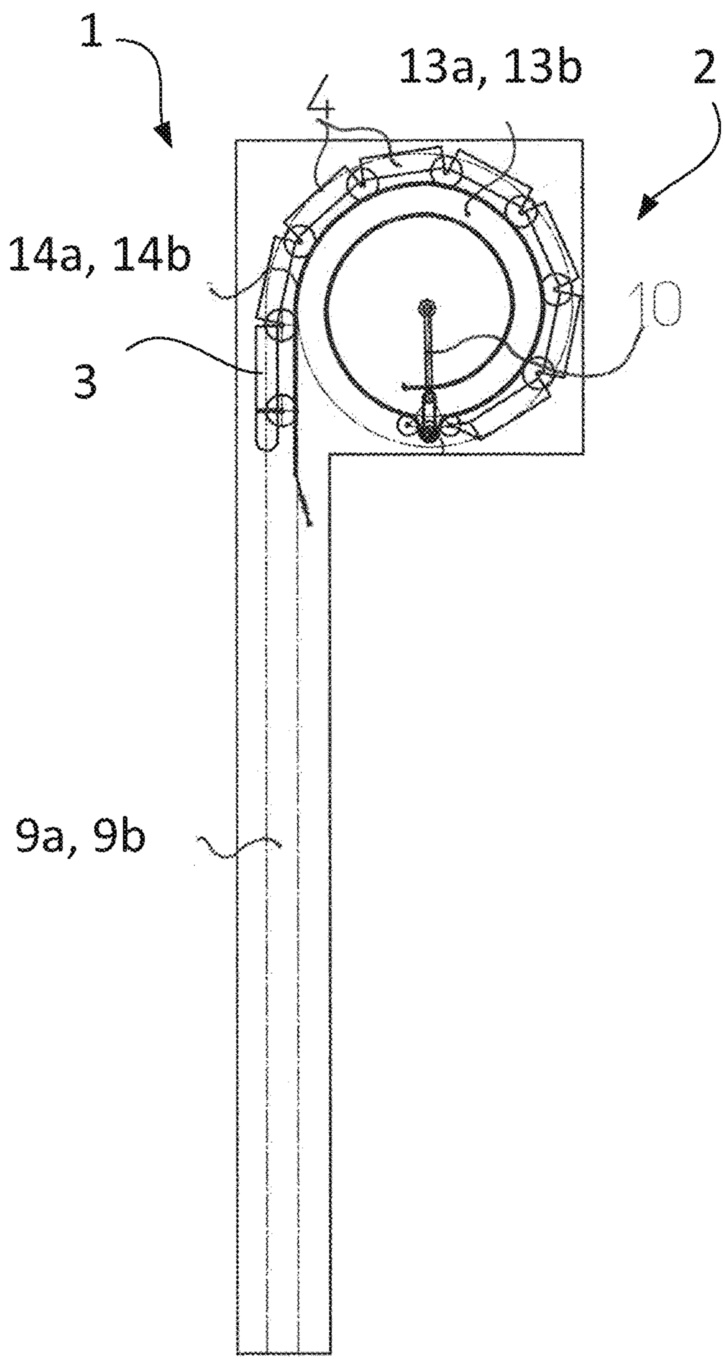
FIG. 3 shows a schematic side view of a door operator system for a door according to the invention, with a protective barrier in a rolled-in open state.

FIG. 3 shows a schematic side view of the door operator system 1 for the door 2 according to the invention, with the protective barrier 3 in a rolled-in open state. In the open position of the door 2, the protective barrier 3 has been rolled-up and pulled away from the door opening 18 and access through the door opening 18 is possible. The protective barrier 3 in FIG. 3 has been pulled up and rolled-up on the curved or spiral shaped curved or spiral tracks 13*a*, 13*b*. The door 2 in FIG. 3 has a vertical configuration. Pulling up or rolling up the protective barrier 3 in a spiral require a minimum of space over a lintel 15 when the door 2 is open.

Figure 4:
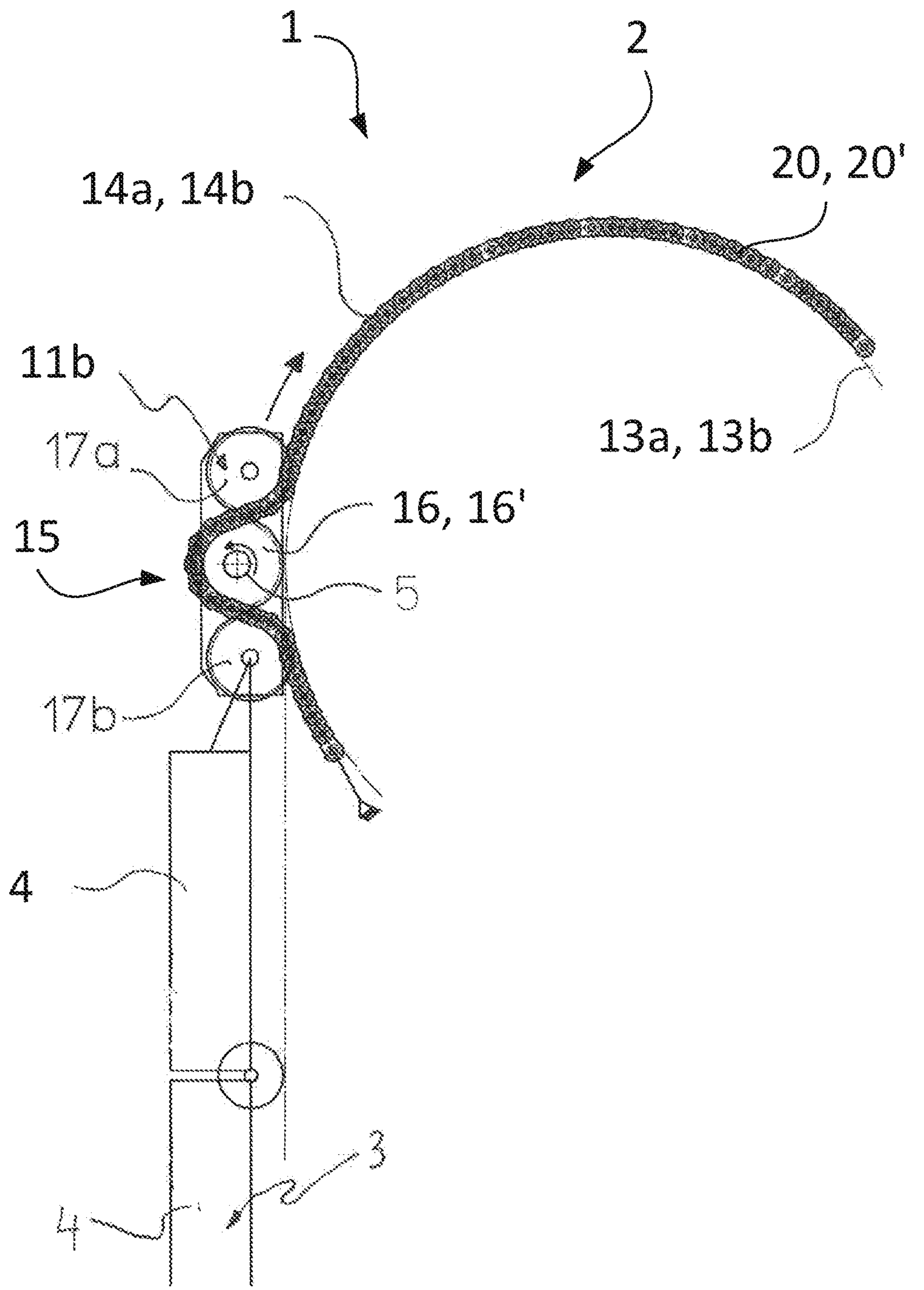
FIG. 4 shows a schematic side view of a section of a door operator system for a door according to the invention, with a protective barrier in a rolled-out closed state.

FIG. 4 shows a schematic side view of a section of the door operator system 1 for the door 2 according to the invention, with the protective barrier 3 in a rolled-out closed state. The omega drive units 11*a*, 11*b* comprise sprockets 16 and the second transmission elements 14*a*, 14*b* are chains 20. Alternatively, the omega drive units 11*a*, 11*b* may comprise toothed pulleys 16' and the second transmission elements 14*a*, 14*b* are timing belts 20'. In FIG. 4 the omega drive units 11*a*, 11*b* are omega drive units 15 comprising sprockets 16 and wheels 17*a*, 17*b*. An omega drive unit 15 may comprise at least one sprocket 16 or at least one toothed pulley 16' and at least two wheels 17*a*, 17*b* arranged along the chain 20 or timing belt 20'.

Figure 5:
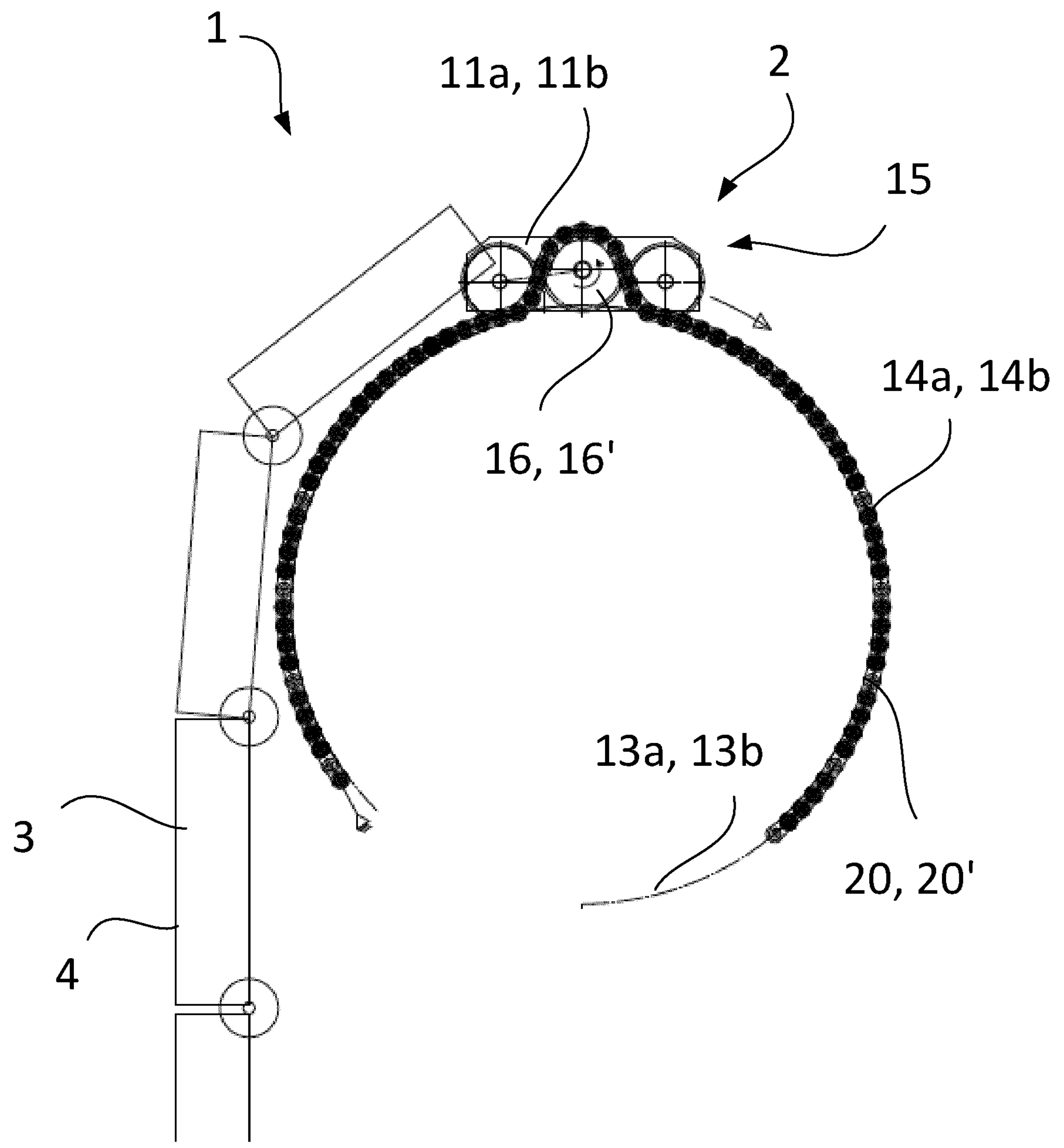
FIG. 5 shows a schematic side view of a section of a door operator system for a door according to the invention, with a protective barrier in a partly rolled-in open state.

FIG. 5 shows a schematic side view of a section of the door operator system 1 for the door 2 according to the invention, with the protective barrier 3 in a partly rolled-up state. The drive unit 6 (FIG. 1) has rotated the sprockets 16 or toothed pulleys 16', so that the omega drive unit 15 has travelled along the chain 20 or timing belt 20'. Since the omega drive unit 15 is connected to the protective barrier 3, also a part of the protective barrier 3 has been pulled into the curved or spiral shaped curved or spiral tracks 13*a*, 13*b*.

Figure 6:
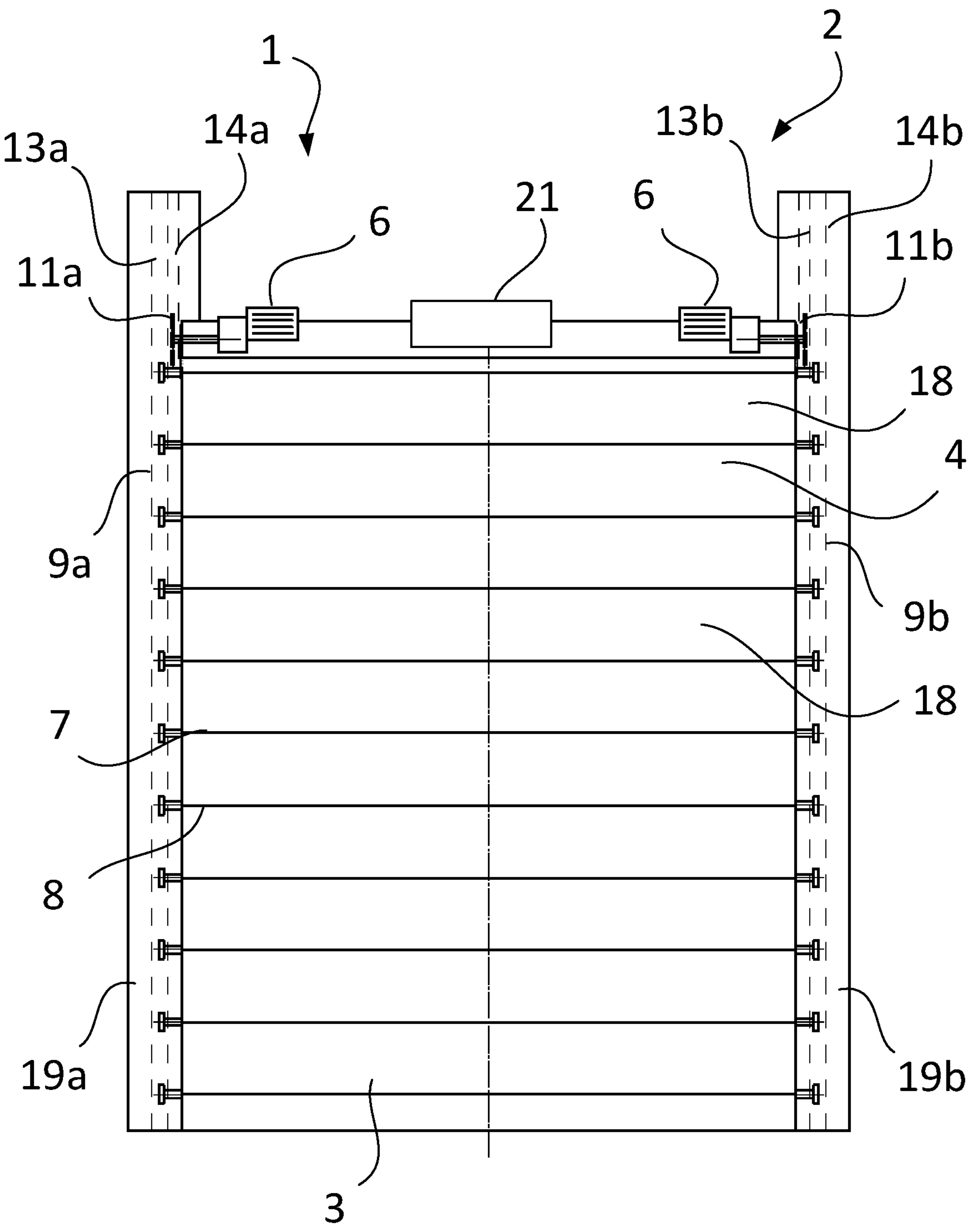
FIG. 6 shows a schematic front view of a door operator system for a door according to the invention, with a protective barrier in a rolled-out closed state.

FIG. 6 shows a schematic front view of the door operator system 1 for the door 2 according to the invention, with a protective barrier 3 in a rolled-out closed state. Two drive units 6 are arranged on the protective barrier 3. The drive units 6 are connected directly to the omega drive units 11*a*, 11*b*. The drive units 6 may be electrical motors driven by a battery 21, which is also arranged on the protective barrier 3. When rolling-in and rolling-out the protective barrier 3, the drive units 6 will follow the movement of the protective barrier 3. Also the battery 7 will follow the movement of the protective barrier 3. The power delivered from the battery may be 50 V or higher.

Figure 7:
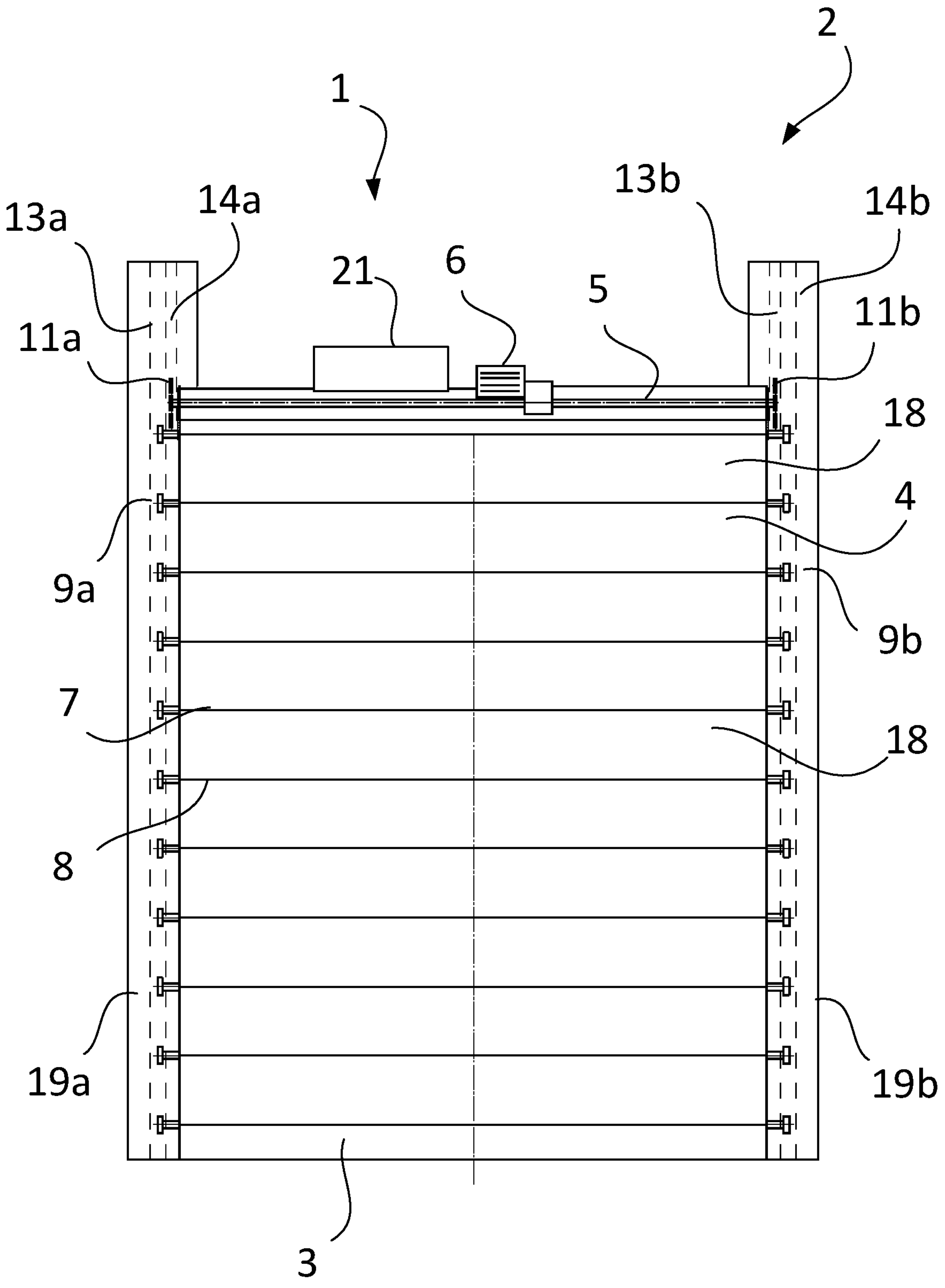
FIG. 7 shows a schematic front view of a door operator system for a door according to the invention, with a protective barrier in a rolled-out closed state.

FIG. 7 shows a schematic front view of the door operator system 1 for a door 2 according to the invention, with a protective barrier 3 in a rolled-out closed state. One drive unit 6 is arranged on the protective barrier 3. The drive unit 6 is connected to the omega drive units 11*a*, 11*b* via the drive shaft 5. The drive unit 6 may be an electrical motor driven by a battery 21, which is also arranged on the protective barrier 3. When rolling-out and rolling-in the protective barrier 3, the drive units 6 will follow the movement of the protective barrier 3. Also the battery 7 will follow the movement of the protective barrier 3.

Figure 8:
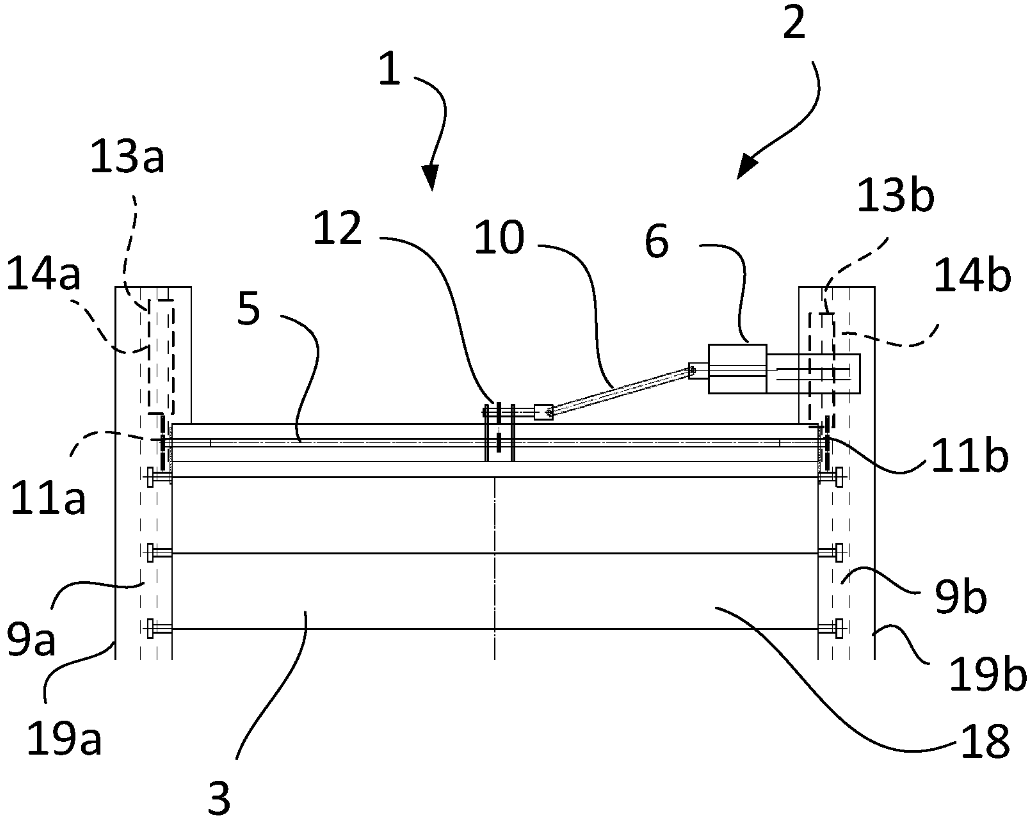
FIG. 8 shows a schematic front view of a door operator system for a door according to the invention, with a protective barrier in a rolled-out closed state.

FIG. 8 shows a schematic front view of the door operator system 1 for the door 2 according to the invention, with the protective barrier 3 in a rolled-out closed state. The curved or spiral tracks 13*a*, 13*b* are arranged at each side of the protective barrier 3 for accommodation of the protective barrier 3 in a rolled-in open state. The drive unit 6 is connected to the protective barrier 3 for moving the protective barrier 3 from a rolled-out closed state to the rolled-in open state and vice versa. The omega drive units 11*a*, 11*b* are connected to the drive unit 6 via the drive shaft 5, the gearbox 12 and the torque transmission unit 10. The drive unit 6 is arranged at a distance from the omega drive units 11*a*, 11*b*. The drive unit 6 is arranged at one of the side frames 19*a*, 19*b*. The drive unit 6 is arranged at an area or space between the curved or spiral tracks 13*a*, 13*b*. The gearbox 12 comprises sprockets and chain and the gearbox 12 is configured to distribute torque and rotational movement from the drive unit 6 to the omega drive units 11*a*, 11*b* via the torque transmission unit 10 and the drive shaft 5. The gearbox 12 is arranged between the omega drive units 11*a*, 11*b* and arranged on the protective barrier 3.

Figure 9:
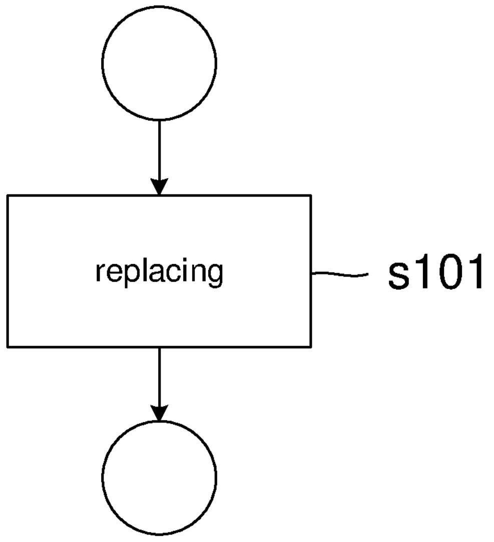
FIG. 9 shows a flow chart of a method for replacing sections of a protective barrier of a door according to the invention.

FIG. 9 discloses a flow chart of a method for replacing sections of a protective barrier 3 of a door 2 according to the invention. The method thus relates to a door operator system 1 for a door 2 with a protective barrier 3 disclosed in FIGS. 1-9. Thus, the door 2 comprising: first tracks 9*a*, 9*b* arranged on side frames 19*a*, 19*b* at each side of the protective barrier 3, wherein the protective barrier 3 is configured to cover a door opening 18 and wherein the protective barrier 3 comprising a plurality of horizontal and interconnected sections 4 connected to the side frames 19*a*, 19*b*; a door operation system 1 comprising: curved or spiral tracks 13*a*, 13*b* arranged at each side of the protective barrier 3 for accommodation of the protective barrier 3 in a rolled-in open state; and at least one drive unit 6 connected to the protective barrier 3 for moving the protective barrier 3 from a rolled-out closed state to the rolled-in open state and vice versa; wherein the protective barrier 3 comprises omega drive units 11*a*, 11*b*, connected to the at least one drive unit 6); wherein the curved or spiral tracks 13*a*, 13*b* each comprises a second transmission element 14*a*, 14*b*; and wherein the omega drive units 11*a*, 11*b* are configured to mesh with the second transmission elements 14*a*, 14*b* and to move the protective barrier 3 along the second transmission elements 14*a*, 14*b* by operating the drive unit 6 for moving the protective barrier 3 from the rolled-out closed state to the rolled-in open state, and vice versa.

The method comprises the step of: replacing s101 at least one of the sections 4 farthermost from the curved or spiral tracks 13*a*, 13*b*.

The person skilled in the art realizes that the present invention is not limited to the preferred embodiments described above. The person skilled in the art further realizes that modifications and variations are possible within the scope of the appended claims. Additionally, all aspects and embodiments of the invention could be combined with the other aspects and embodiments of the invention. Additionally, variations to the disclosed embodiments can be understood and effected by the skilled person in practicing the claimed invention, from a study of the drawings, the disclosure, and the appended claims.

The invention claimed is:

1. A door operation system for a door, the door comprising:

a protective barrier configured to be in a rolled-in open state and configured to cover a door opening in a rolled-out closed state; and first tracks arranged on side frames at each side of the protective barrier; the door operation system comprising:

spiral tracks arranged on the side frames at each side of the protective barrier for accommodation of the protective barrier in the rolled-in open state, wherein the spiral tracks each comprise a curved surface and a center, where centers of the respective spiral tracks define a horizontal axis; and a drive unit connected to one of the side frames for moving the protective barrier from the rolled-out closed state to the rolled-in open state and vice versa;

a torque transmission unit connected at a first end with the at least one drive unit at the center of the one spiral track and extending into a space between the spiral tracks, wherein the protective barrier comprises first transmission elements connected to a second end of the torque transmission unit and wherein the torque transmission unit extends into the space at an angle with respect to the horizontal axis;

wherein the spiral tracks each comprise a second transmission element, wherein the second transmission element is configured to follow a contour of the curved surface of the respective spiral track; and wherein the first transmission elements are omega drive units fixed to an upper area of the protective barrier and configured to mesh with the second transmission elements and to move the protective barrier along the curved surfaces by operating the drive unit for moving the protective barrier from the rolled-out closed state to the rolled-in open state, and vice versa, wherein the omega drive units pull a top of the protective barrier along the curved surface into the rolled-in open state, wherein the angle varies as the protective barrier moves along the curved surfaces and wherein the torque transmission unit compensates for changes of the angle.

2. The door operation system according to claim 1, wherein a gearbox is arranged between the torque transmission unit and a first one of the omega drive units, which gearbox is configured to distribute torque and rotational movement from the drive unit to the omega drive units.

3. The door operation system according to claim 1, wherein the torque transmission unit is a telescopic propeller shaft and wherein the telescopic propeller shaft compensates for a change in a distance between the at least one drive unit and the first transmission elements.

4. The door operation system according to claim 1, wherein the torque transmission unit is a flexible shaft.

5. The door operation system according to claim 1, wherein the omega drive units comprise sprockets and the second transmission elements are chains.

6. The door operation system according to claim 1, wherein the omega drive units comprise toothed pulleys and the second transmission elements are timing belts.

7. The door operation system according to claim 5, wherein the omega drive units comprise sprockets or toothed pulleys and wheels.

8. The door operation system according to claim 1, wherein the protective barrier comprising a plurality of horizontal and interconnected sections guided in the side frames.

9. The door operation system according to claim 7, wherein the omega drive units are arranged to move along the curved surfaces of the spiral tracks.

10. A method for replacing sections of a protective barrier of the door according to claim 1, wherein the protective barrier comprises a plurality of horizontal and interconnected sections connected to the side frames, and wherein the method comprises a step of:

replacing at least one of the plurality of sections farthermost from the spiral tracks.

11. A door operation system for a door, the door comprising:

a protective barrier configured to be in a rolled-in open state and configured to cover a door opening in a rolled-out closed state; and first tracks arranged on side frames at each side of the protective barrier; the door operation system comprising:

spiral tracks arranged on the side frames at each side of the protective barrier for accommodation of the protective barrier in the rolled-in open state, wherein the spiral tracks each comprise a curved surface and a center wherein centers of the respective spiral tracks define a horizontal axis; and a drive unit connected to one of the side frames for moving the protective barrier from the rolled-out closed state to the rolled-in open state and vice versa;

a torque transmission unit connected at a first end with the at least one drive unit at the center of the one spiral track and extending into a space between the spiral tracks, wherein the protective barrier comprises first transmission elements connected to a second end of the torque transmission unit and wherein the torque transmission unit extends into the space at an angle with respect to the horizontal axis;

wherein the spiral tracks each comprise a second transmission element, wherein the second transmission element lies along the curved surface of the respective spiral track; and wherein the first transmission elements are omega drive units fixed to an upper area of the protective barrier and configured to mesh with the second transmission elements and to move the protective barrier along the curved surfaces by operating the drive unit for moving the protective barrier from the rolled-out closed state to the rolled-in open state, and vice versa, wherein the omega drive units pull a top of the protective barrier along the curved surface into the rolled-in open state, wherein the angle varies as the protective barrier moves along the curved surfaces and wherein the torque transmission unit compensates for changes of the angle.

* * * * *